July 5, 1966   B. SANDOR   3,259,708

SWITCH AND STRIKER ASSEMBLY FOR VEHICLE BODIES

Filed April 13, 1964

INVENTOR.
Bela Sandor
BY
Herbert Furman
ATTORNEY

United States Patent Office 3,259,708
Patented July 5, 1966

3,259,708
SWITCH AND STRIKER ASSEMBLY FOR VEHICLE BODIES
Bela Sandor, Detroit, Mich., assignor to General Motors Corporation, Detroit, Mich., a corporation of Delaware
Filed Apr. 13, 1964, Ser. No. 359,190
5 Claims. (Cl. 200—61.68)

This invention relates to circuit controllers and more particularly to a combined switch and striker assembly for vehicle bodies.

Many strikers currently in use include a wedge-shaped shoe of nylon or other plastic material which engages a portion of the latch assembly when the latch means is received within the striker to wedge the latch bolt against the teeth or other bolt retaining means of the striker and maintain the door or closure in closed position. Normally the shoe is slidably mounted on the striker and biased to one terminal position thereof.

This invention combines a switch with the striker and controls the opening and closing of the switch in accordance with the position of the shoe with respect to the striker. The switch energizes or de-energizes the dome or other body interior light which is connected across the switch and a source of power. The switch is closed when the shoe is in one terminal position thereof and out of engagement with the latch means to energize the light when the door is opened, and the switch is open and the light de-energized upon engagement of the latch means with the shoe to move the shoe out of its terminal position when the door is closed.

One feature of this invention is that it provides a combined switch and striker assembly for vehicle bodies. Another feature of this invention is that it provides a combined switch and striker assembly for vehicle bodies wherein the switch is controlled by the position of a movable abutment member of the striker assembly. Yet another feature of this invention is that it provides a switch assembly for controlling a vehicle body light, with the switch being controlled in accordance with the position of an abutment member of a vehicle body striker assembly.

Figure 1:
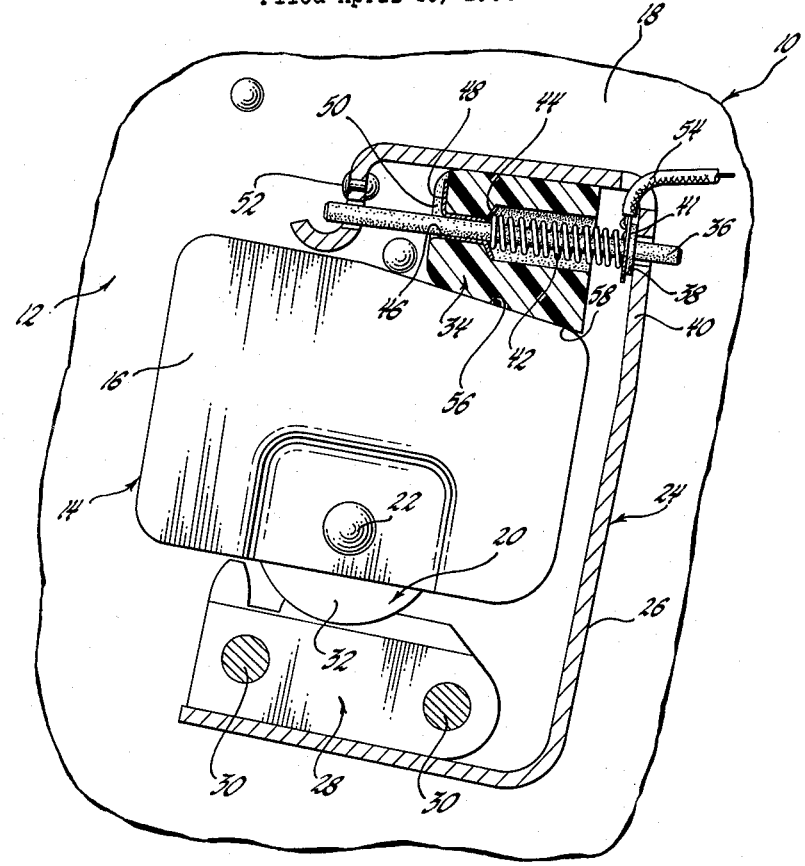
Figure 2:
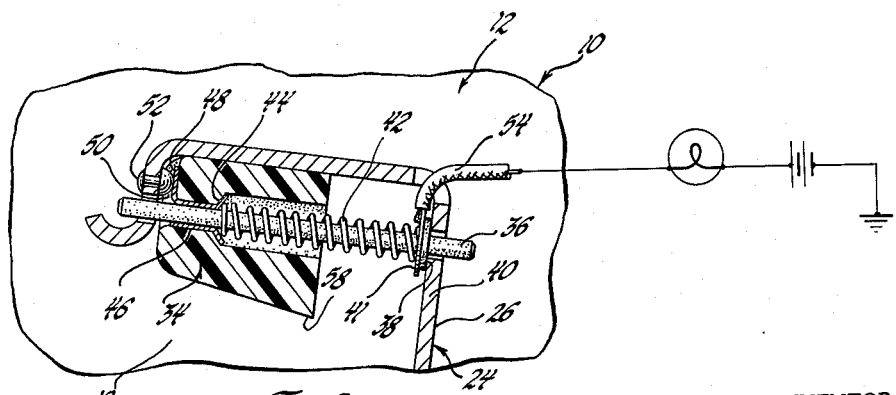

These and other features of the invention will be readily apparent from the following specification and drawings wherein:

FIGURE 1 is a partially cut away partial view of a vehicle body embodying a switch and striker assembly according to this invention, with the switch being shown in open position; and FIGURE 2 is a partial view similar to FIGURE 1 and showing the switch in closed position.

Referring now particularly to FIGURE 1 of the drawings, a vehicle body designated generally 10 includes a door or other closure member 12 which is swingably mounted on the body for movement between open and closed positions and includes a latch assembly or means 14 which is mounted interiorly of the door 12 and includes a bolt housing 16 which extends laterally of the jamb face 18 of door 12 and houses a rotary bolt 20 which is pivotally mounted therein at 22.

A striker assembly or means designated generally 24 includes a generally C-shaped die cast or sheet metal housing 26 which is mounted on a body pillar, not shown. The lower portion of the striker assembly 24 includes a toothed member or insert 28 which is bolted to the striker assembly and to the body pillar by bolts 30. The teeth of the member 28 cooperate with the teeth, not shown, of the bolt 20 to retain the door in closed position when the bolt is in latched position, and a flange 32 of the bolt 20 is positioned adjacent to and in overlapping relationship to the teeth of the member 28 to provide an interlock. The upper portion of the striker assembly 24 mounts a slidable shoe 34 of nylon or other plastic material, as will be described, to wedge the teeth of the bolt 20 into engagement with the teeth of the member 28. An arrangement such as this is currently in production use in several makes of automobiles and reference may be had to Cockburn et al. 3,034,818 for more of the details.

A pin 36 of plastic or other insulating material extends between apertured opposite walls of the striker assembly 24 and includes an integral annular flange 38 which is normally positioned against one apertured wall 40 of the striker assembly. An apertured metal washer 41 or contact seats against the flange 38 and seats one end of a metal coil compression spring 42, the other end of which seats on an annular lateral flange 44 of a sleeve 46 which is mounted within a reduced bore portion of the shoe 34 and provides a bearing for the shoe on the pin 36. Sleeve 46 further includes a laterally extending flange or tab 48 which is mounted within a slot or recess 50 in the outer face of the shoe 34 and contacts a metal rivet 52 secured to the other apertured wall of the housing 24 in one position of the shoe, as will be described. The contact 41 is connected by a conductor 54 across a battery or other source of power and across a dome or other interior light of the vehicle, as schematically shown in FIGURE 2.

When the housing 16 of the latch means is not received within the striker means 24 when to door is open, the spring 42 biases the shoe 34 to the left to a terminal position thereof, as shown in FIGURE 2, to locate the tab 48 in engagement with the rivet 52 and thereby complete a circuit across the dome light and power source to ground. The dome or other interior light will thus be energized when the door is open. When the door is closed, the upper tapered surface 56 of the housing 16 will engage the lower complementary tapered surface 58 of the shoe 34 to move the shoe to the right, from its position of FIGURE 2 to its position of FIGURE 1, as the housing 16 moves within the striker assembly to move the tab 48 out of engagement with the rivet 52 and thereby open the circuit across the power source to de-energize the dome or other interior light.

Thus, this invention provides a combined switch and striker assembly for vehicle bodies.

I claim:

1. In combination with a closure member movable relative to a body member, support means mounted on one of said members and including guide means, an abutment member of nonconductive material mounted on said guide means for movement relative to said support means, first contact means mounted on said support means, second contact means mounted on said abutment member, means normally biasing said abutment member along said guide means in a direction to engage said first and second contact means, and cooperating latch and striker means on a respective one of said closure member and body member, one of said cooperating means being movable into engagement with the other of said cooperating means to wedge said one of said cooperating means between the other of said cooperating means and said abutment member upon movement of said closure member to closed position relative to said body member as said abutment member moves along said guide means against the action of said biasing means and disengages said first and second contact means.

2. The combination recited in claim 1 wherein said support means includes spaced walls, said guide means extends between said walls, said first contact means is mounted on one of said walls and said biasing means biases said abutment member toward said one wall.

3. The combination recited in claim 2 wherein said biasing means seats on the other of said walls and on said second contact means and surrounds said guide means.

4. The combination recited in claim 1 wherein said support means includes spaced walls, said guide means comprises a rod of nonconductive material extending between said walls, said second contact means includes a seat portion and said biasing means seats on said abutment member seat portion and on a wall of said support means.

5. The combination recited in claim 1 wherein said support means includes spaced walls, said guide means comprises a rod of nonconductive material extending between said walls, said abutment member including a bore receiving said rod therethrough, said first contact means being mounted on one of said walls, said second contact means including a seat portion to one side of said bore and a contact portion to the other side thereof, and said resilient means seats on the other of said walls and on said second contact seat portion.

References Cited by the Examiner
UNITED STATES PATENTS

| | | | |
|---|---|---|---|
| 1,399,170 | 12/1921 | Vandevelde | 200—61 |
| 2,638,516 | 5/1953 | Forman | 200—61 X |

B. DOBECK, *Primary Examiner.*

BERNARD A. GILHEANY, *Examiner.*

J. J. BAKER, *Assistant Examiner.*